PRODUCTION OF AN ELECTRICAL DEVICE

Filed July 29, 1965 4 Sheets-Sheet 1

INVENTORS
Hans-Jurgen Schutze &
Klaus Hennings

BY Spencer & Kaye

ATTORNEYS

INVENTORS
Hans-Jurgen Schutze &
Klaus Hennings

BY Spencer & Kaye

ATTORNEYS

INVENTORS
Hans-Jurgen Schutze &
Klaus Hennings
BY Spencer & Kaye
ATTORNEYS

Aug. 19, 1969 HANS-JURGEN SCHUTZE ET AL 3,461,548

PRODUCTION OF AN ELECTRICAL DEVICE

Filed July 29, 1965 4 Sheets-Sheet 4

INVENTORS
Hans-Jürgen Schütze &
Klaus Hennings

BY Spencer & Kaye

ATTORNEYS

United States Patent Office
3,461,548
Patented Aug. 19, 1969

3,461,548

PRODUCTION OF AN ELECTRICAL DEVICE

Hans-Jurgen Schutze and Klaus Hennings, Ulm (Danube), Germany, assignors to Telefunken Patentverwertungs-G.m.b.H., Ulm (Danube), Germany Filed July 29, 1965, Ser. No. 475,806
Claims priority, application Germany, July 29, 1964, T 26,691; Nov. 23, 1964, T 27,468
Int. Cl. B01j *17/00;* H05k *3/00*
U.S. Cl. 29—577 20 Claims

ABSTRACT OF THE DISCLOSURE

A method of fabricating a microminiaturized circuit arrangement by forming a solid-state circuit having a semiconductor body in which at least one circuit element is formed, placing a self-supporting insulating body on the surface of the solid-state circuit, and then at least partially electrically isolating the circuit elements from one another by removing material from the semiconductor body.

This invention relates to a method for the production of an electrical device, and particularly to a method of fabricating a microminiaturized circuit arrangement.

In modern technology, there is a great need for a wide variety of solid-state body hybrid circuits. The term "solid-state body hybrid circuit" means a microminiaturized circuit arrangement containing preferably active semiconductor components in a semiconductor body, and passive components and/or conductive paths disposed on an insulating layer covering the semiconductor body. This insulating layer is also called a passivation layer. Such a circuit arrangement is particularly characterized in that the active semiconductor components contact one side of the insulating layer, while the passive components contact the other side of the insulating layer, the two sides of the insulating layer being disposed opposite to one another.

As is known, the active components of a solid-state body hybrid circuit are capacitatively coupled together as a consequence of the high dielectric constant of the semiconductor material, and the passive components on the insulating layer are capacitatively coupled together because of the small thickness of the layer, which coupling leads to functional difficulties and/or to disturbances in the circuit arrangement.

In order to eliminate the capacitative coupling between the active semiconductor components of a solid-state circuit, a method has been disclosed, called the separation method, wherein monocrystalline zones are produced in the semiconductor body, these zones being embedded in insulating layers, and the semiconductor components are then placed in these zones. It has also been proposed to completely or partially remove the semiconductor material surrounding the active semiconductor components. In order to eliminate the capacitative coupling between the passive components and the semiconductor body, it has been suggested either to thicken the insulating layer, or to remove a portion of the semiconductor material underneath the insulating layer. However, all methods have in common that the semiconductor body is used as the support for the microminiaturized circuit arrangement. Besides, further disadvantages are inherent in the above-mentioned methods, such as, for example, the need to use extremely precise lapping and/or abrasion techniques, difficulties in carrying out the etching processes, problems in accurately placing the conductive and resistance paths across the layers which insulate the monocrystalline zones, as well as stabilizing problems.

It is an object of the present invention to provide a method for producing a microminiaturized circuit arrangement which is not subject to the above-described disadvantages.

In accordance with the invention, this result is obtained by employing a method wherein: a solid-state circuit having a semiconductor body in one surface of which is formed at least one semiconductor circuit element is first produced and that portion of the surface which contains such elements is covered with an insulating layer to form a base unit; thereafter, conductive terminals are provided on the insulating layer so that one end of each terminal contacts a selected region of one semiconductor element and the other end of each terminal extends laterally beyond the lateral dimensions of its respective element and a self-supporting insulating body is placed on the surface of the solid-state circuit; then, the circuit elements are at least partially electrically isolated, i.e., conductively insulated and/or capacitatively decoupled by the removal of semiconductor material; and finally, the insulating layer is perforated at points directly above those ends of the terminals which extend laterally beyond the elements and passive elements and conductive paths are deposited on that side of the insulating layer which faces the active elements and connections are established, through the perforations, between the terminals and the elements and conductive paths.

Thus, the basic concept of the invention is that first a solid-state circuit with a semiconductor body as the base is produced and that this solid-state circuit is then converted, by placing thereon an insulating body and by substantially modifying the configuration of the semiconductor body, into a circuit having as its support an insulating body instead of the semiconductor body.

The essential advantage of the present invention is that a commercially available solid-state circuit can be used as the starting point, this circuit being tested as to its functional ability in accordance with conventional considerations, and that this circuit can subsequently be endowed with the known advantages of the thin-film circuit, namely, the complete electrical insulation between the active and passive components. Capacitative shunts are decreased, particularly in the case of the active elements, to a value which probably represents their theoretical minimum. The disadvantages inherent in the thin-film circuits due to the necessity for separately bonding encapsulated on non-encapsulated active elements to the lead pattern of the thin-film network are automatically circumvented, since the active elements are already in hermetic contact with the insulating substrate. Consequently, the leads making contact to the active elements proceed through the insulating substrate body. This feature is substantially different from thin-film circuits, where conductive paths proceed along the surface of the insulating substrate. The thin-film circuit produced in accordance with the method of this invention also has a very great resistance to shock and acceleration because the active elements are grown onto the substrate, creating a condition whereby the chemical cohesive forces would have to be overcome before the active elements could be separated from the substrate.

In order to conductively isolate the elements provided in the semiconductor body and to remove the undesired coupling capacitances in the circuit, the semiconductor body is preferably removed to such an extent as to leave areas containing the active semiconductor components. The surface of the solid-state circuit is preferably passivated before the insulating body is applied. For this purpose, a passivation layer is provided on the surface of the semiconductor body and, if desired, on the passive elements of the solid-state circuit. For the passivating layer, there can be employed, for example, an oxide layer composed of silicon oxide. The insulating body material is preferably chosen to have a coefficient of thermal expansion which coincides with that of the semiconductive body or of the insulating layer. The insulating body may be made of several layers of insulating material. Suitable materials for the insulating body are, for example, glass materials such as aluminum- or boron-silicate glass. The insulating body can also be made of a ceramic material such as, for example, aluminum oxide. A further possibility is to produce the insulating body of a mixture of glass and/or ceramic materials. As a specific example, in the case of a silicon semiconductor body with a thermal expansion coefficient of $4.2\times10^{-6}$ cm./cm./° C., an insulating substrate of boro-silicate glass has proven satisfactory as well as an alumino-silicate glass, because of its closely matching thermal expansion coefficient of $4.0\times10^{-6}$ cm./cm./° C. The boro-silicate or the alumino-silicate substrate is preferably attached to the semiconductor body by using a low-melting glass solder, for example, pyroceram. This is essentially a lead glass with additives of boron-trioxide, silicon-dioxide, and zinc oxide to the amount of 10 to 20 percent each.

The manufacture of a microminiaturized circuit arrangement can be carried out, in accordance with the invention, for example by providing the active elements preferably at least in part within a semiconductor body of any suitable type known to the prior art, and by placing passive elements, as well as conductive paths, upon the surface of the semiconductor body, which surface may have been previously passivated, if desired, and further by providing on top of the solid-state circuit an insulating layer whose thickness is sufficient to make it self-supporting, this layer being formed, for example, by sintering or by soldering an insulating substrate on top of said solid-state circuit. The removal of the semiconductor body is carried out from the side facing away from the insulating layer, for example mechanically and/or chemically, in such a manner that there are left on the insulating layer essentially only the semiconductor areas which contain the preferably active semiconductor components. The removal of the semiconductor body can also be carried out by means of various well-known selective, self-limiting etching processes, such as etching with chlorine gas or with organic etchants such as, for example, a solution of catechol and anhydrous hydrazine.

In order to make connections to the circuit arrangement, in cases where the solid-state circuit is provided with a passivating layer, the conductive and/or resistance paths may be uncovered by removing this passivating layer at the points where connections are to be made. It is preferable to enlarge the conductive paths located between the insulating body and the passivating layer in the region of their outer contact surfaces.

In order to make connections to the conductive paths and/or passive elements located between passivating layers or between the insulating layer and the passivation layer which is in contact with the semiconductor body, special connecting paths can also be deposited on that passivation layer surface which faces the surface of the semiconductor body, to which connecting paths the external contacts are provided by soldering, welding, supersonic welding, thermocompression, or by a combination of these procedures.

It is also possible to uncover part of the insulating body surface which faces the passivating layer by removing part of the passivating layer for the purpose of vapor-depositing thereon connecting paths for the conductive paths or the passive elements and subsequently to provide leads, particularly wires or small strips, on the connecting paths, by means of soldering, welding, or thermocompression.

In order to provide external contacts, it is also possible to employ strongly degenerately doped semiconductor islands which are uncovered, starting from the semiconductor body surface which faces away from the insulating layer, by means of a selective etching process.

It may be desired to isolate the active circuit components in the semiconductor body prior to the formation of the insulating body, for example by means of a separation diffusion, in order to permit the circuit to be electrically tested before the insulating body is applied. However, it is possible to proceed without such a separation before the insulating body is provided, and to subsequently separate the elements solely by removing the semiconductor material.

Additional objects and advantages of the present invention will become apparent upon consideration of the following description when taken in conjunction with the accompanying drawings in which:

FIGURE 1 is a cross-sectional view of a unit fabricated according to the present invention.

FIGURE 2*a* is an equivalent circuit diagram of another unit fabricated according to the present invention.

FIGURE 2*b* is a top view of the unit represented in FIGURE 2*a*.

Figure 1:
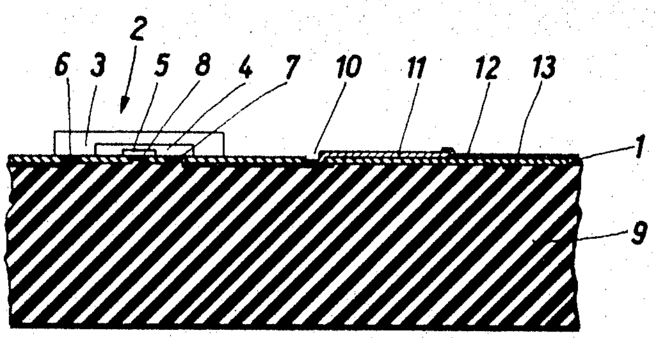

An embodiment of the method according to this invention will be explained with reference to FIGURE 1. A semiconductor body, for example a silicon semiconductor body, is provided, for passivating purposes, with an insulating layer 1, for example a silicon oxide layer; then active semiconductor components, for example at least one transistor 2 having collector zone 3, base zone 4, emitter zone 5, terminals 6, 7 and 8, connected thereto, are produced within this semiconductor body. The terminals 6, 7 and 8, produced in accordance with the conventional strip-landing technique, are disposed on the surface of the insulating layer 1 and are extended beyond the lateral dimensions of the transistor 2, terminal 6 being extended to the left, terminal 7 to the right, and terminal 8 into the plane of FIGURE 1. Subsequently, an insulating supporting body 9 is provided on the side of the semiconductor arrangement containing the transistors 2 and the terminals 6, 7 and 8, this body being applied, for example, by sintering or melting thereon a glass layer having, for example, a thickness of 200$\mu$. The carrier body can also be vapor-deposited thereon by means of electron or laser beams. Thereafter, the unnecessary semiconductor material is removed around the transistor 2, for example by an etching process, and subsequently the insulating layer 1 is perforated at points above the ends of the transistor terminals 6, 7, and 8, for example at point 10. Subsequently, passive elements, for example a resistor 11, and conductive paths, for example a conductive path 12, are provided on that surface of the insulating layer 1 which faces the transistor 2.

The method of the present invention may also be utilized to permit one conductive path to cross another path while preventing the two from making electrical contact. For this purpose, conductive path bridges 13 are vapor-deposited onto the insulating layer 1 before the carrier body 9 is applied. After the carrier body 9 is applied, the insulating layer 1 is perforated at points above the ends of the conductive path bridges 13, and subsequently conductive paths in contact with the ends of bridges 13 are passed through these perforations in the insulating layer 1 and are continued on the other side of the insulating layer.

In according with the invention, it is possible to cover the passive elements, after they have been mounted on the insulating layer 1, with a further insulating layer for the purpose of passivation. Moreover, it is possible according to the invention to use, for producing the patterns of the passive components and/or conductive paths, photomasks containing recesses for the active semiconductor elements, so that when the mask is placed on the surface where active elements are located, the photomask rests in close contact directly on the insulating body 9–1.

Figure 2A:
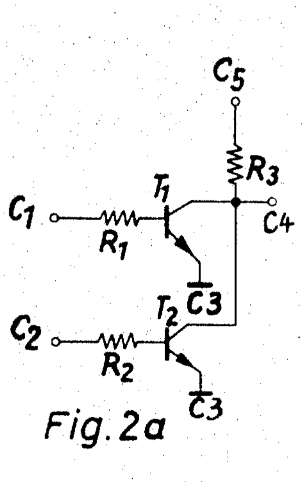
Figure 2B:
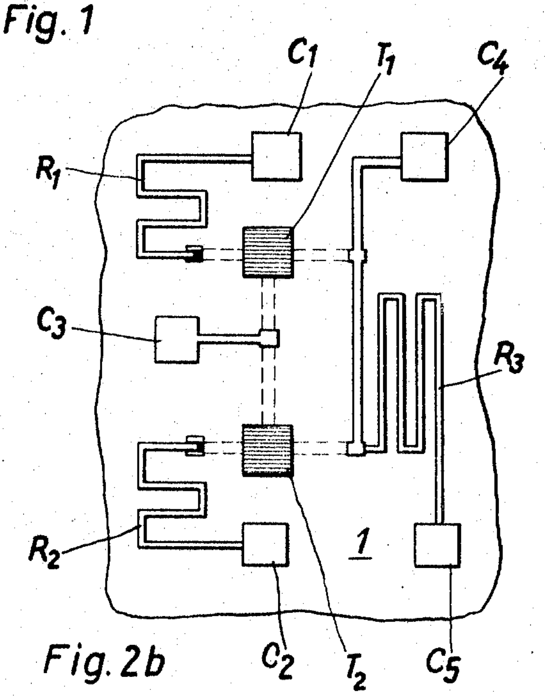

Another embodiment of the method of this invention is illustrated in FIGURES 2*a* and 2*b*. FIGURE 2*a* shows the circuit diagram of a NOR-gate. It contains the two transistors $T_1$ and $T_2$, the three resistors $R_1$, $R_2$ and $R_3$, as well as the input terminals $C_1$ and $C_2$, the grounding contact $C_3$, the output $C_4$ and the battery terminals $C_5$. FIGURE 2*b* shows the realization of this circuit with the aid of the method of the present invention. Thus, the transistors $T_1$ and $T_2$ are identical with the transistor 2 of FIGURE 1, and the conductive paths and resistors shown in solid lines are disposed on the top surface of the layer 1 (the surface away from body 9), while the paths shown in broken lines are disposed on the bottom surface thereof, in the manner described in connection with the paths 6, 7 and 8 of FIGURE 1.

In the remaining drawing figures, elements bearing the same reference numerals as those shown in FIGURE 1 are identical thereto.

Figure 3:
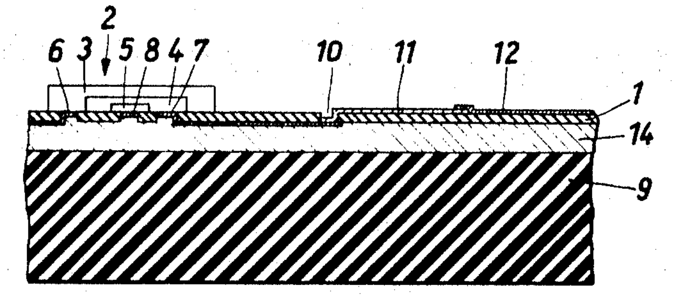
FIGURES 3 to 6 are views similar to that of FIGURE 1 showing various other units fabricated according to the present invention.

A unit produced according to a further embodiment of the method of the invention is illustrated in FIGURE 3. In this case, the insulating carrier body is formed of two layers, namely, preferably a ceramic body 9 with a glazing 14 provided thereon. This embodiment is characterized by a good heat dissipation capability. The ceramic body 9 carries out the heat dissipation proper, while the glazing 14 solidly connects the ceramic body 9 with the insulating layer 1. The remaining elements are obtained in the manner set forth above with reference to FIGURE 1.

A good material for the insulating carrier body is high purity aluminium oxide or sapphire. The thermal expansion coefficient of this material is in close proximity to that of silicon serving as the semiconductor body. A thin layer of a glass solder is then placed on top of the aluminium oxide substrate, preferably by well-known means of a transfer tape. This is, for example, a Mylar carrier tape coated with a thin layer of the glass solder. A few microns thickness of the layer is typical. Poly-n-butylmethacrylate serves as the bonding agent. This tape is pressed on top of the insulating body and the carrier tape simply released. On top of the glass solder, which is typically a pyroceram glass, the semiconductor body is placed. Heating this assembly at about 500° C. for approximately 1 hour devitrifies the glass solder, hence matching its thermal expansion coefficient and creating a strong bonding.

A further development of the method of the invention may be carried out in the following manner: The ceramic body 9 of FIGURE 3 is provided with a glazing not only on its upper surface, but also on its underside. Then, two finished solid-state hybrid circuits are placed on the glazed ceramic body on opposite sides thereof and brought, together with the ceramic body, to a temperature between 500 and 1,000° C. During this process, the glazing melts, and thereby connects the passivating layers of the two hybrid circuits with the ceramic body. The further treatment of the arrangement is carried out as described in connection with the embodiment illustrated in FIGURE 1. In this manner, a two-level thin-layer hybrid circuit is obtained. In accordance with the invention, it is possible to produce electrical connections from one level to the other, for example by means of pins embedded in the ceramic body and extending through the glazing, these pins being provided at their tips with a solderable coating.

Figure 4:
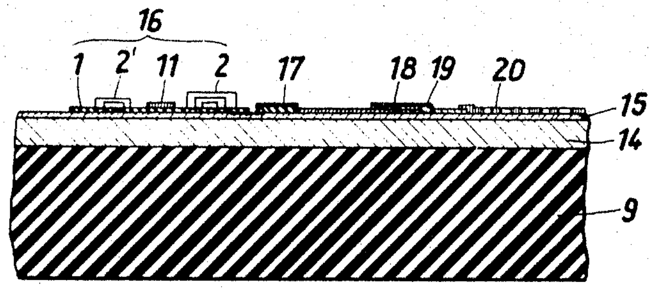

A further result of the use of the inventive method is shown in FIGURE 4. On the ceramic body 9, there are provided the glazing 14, as well as a very thin, for example up to 1μ thick, insulating solder layer 15, for example made from an alkali-free glass solder. The layer 15 may be provided either on the entire surface of glazing 14 or merely in the regions occupied by the passivating layer 1 of the finished hybrid circuit 16 and serves for connecting the hybrid circuit 16 with the insulating carrier 9–14 in a fixed and reliable manner. The hybrid circuit 16 includes the passivation layer 1, the active semiconductor elements 2 and 2' with their associated terminals, as well as the passive components 11. The connection of this circuit with further components on the insulating body is carried out, for example, via a multi-layer conductive path 17 which is produced, for example, by the vapor deposition of copper or nickel-chrome-gold conductive paths which may be subsequently tinned. This procedure serves to assure good adhesion and to prohibit the formation of interruptions in the conducting paths. The conductive path 17 is widened at its end to form a capacitor electrode. A dielectric 18 is placed on this widened portion, for example by vapor deposition, and upon this dielectric there is provided, in turn, the second electrode 19 for the capacitor, this electrode being extended by a conductive path and which is connected to non-linearly shaped resistance path 20.

The last-described embodiment of the inventive method also lends itself readily to the fabrication of thin-film two-tier hybrid circuits.

In accordance with the invention, it is also possible to utilize a body of magnetic material, for example, ferrite, as the insulating support body 9. In this case, it is advantageous to coat the support body with a glazing layer which covers only a portion of its surface. A nickel-zinc-ferrite is a proper magnetic substrate material with a very high resistivity and a proper thermal expansion coefficient of 7 to $8\times10^{-6}$ cm./cm./° C. Glazing is performed with lead glass at a temperature of about 600° C. in air. The glass layer is composed of about 70 percent lead oxide and a few percent each of boron oxide, silicon oxide, barium oxide, and zinc oxide, and has a thermal expansion coefficient of about $9\times10^{-6}$ cm./cm./° C.

Figure 11:
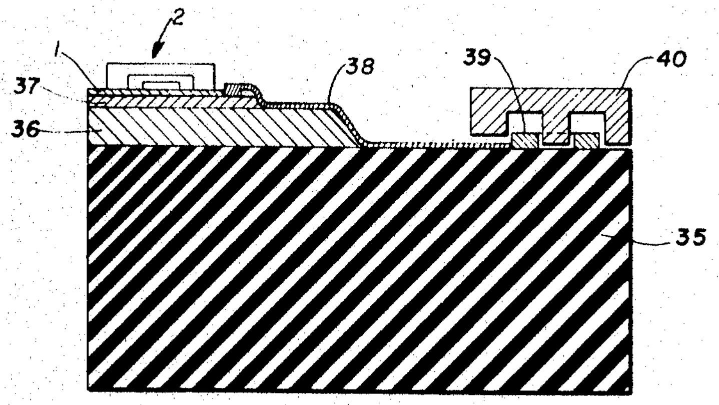
FIGURE 11 is a view similar to that of FIGURE 1 showing yet another unit fabricated according to the present invention.

The configuration of the substate is shown in FIGURE 11. The top surface of the ferrite substrate 35 is partially covered with the glazing 36 and this again is covered with a glass solder 37, which bonds the passivation layer 1 of the semiconductor body to the glazing. Again the isolated transistor 2 is obtained by removing abundant semiconductor material. The conductive path 38 is vapor-deposited connecting the active element 2 with a coil 39, vapor-deposited, for example, on the unglazed portion of the ferrite body. Finally, a cup-shaped ferrite body 40 is placed on this coil in a well-known manner. In this simple way, it is possible to combine an inductance with a thin-film hybrid circuit.

Figure 5A:
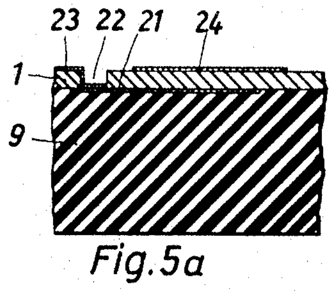
Figure 5B:
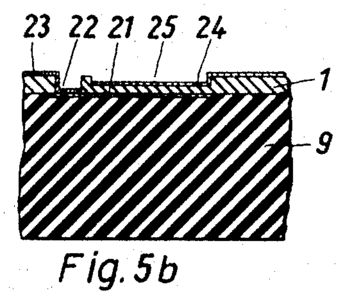

Another example of the results obtainable through the use of the method of the present invention will be explained with reference to FIGURE 5. A semiconductor body is again provided with a passivating layer 1, for example by thermal oxidation, and the layer is provided with metallic electrodes 21, for example by vapor deposition. If desired, a portion of this electrode may be made wide to act as a capacitor plate. Thereafter, an insulating carrier 9 is provided on the side of the arrangement carrying the metallic electrodes 21, and the semiconductor material on the other side of the arrangement is then removed, down to the passivating layer 1, as can be seen from FIGURE 5*a*. Subsequently, perforations 22 are made in the passivating layer 1, and then conductive paths 23 are, for example, vapor deposited onto the upper surface of the unit, in such a manner that these paths are connected with the metallic electrodes 21 via the perforations 22. Simultaneously, or thereafter, electrodes 24, which form the second plate of the capacitor created by the widened portion of electrodes 21 and portions of layer 1, are provided on the passivating layer 1. FIGURE 5*b* illustrates a modification of the described method wherein the thickness of the passivating layer 1 is diminished by chemical etching for example, in the region where it acts as the capacitor dielectric, creating the recesses 25 into which the electrodes 24 are introduced. In this manner, it is possible to achieve both a very high surface capacitance, for example of the order of 0.1 $\mu$f./cm.$^2$, and also, on account of the unchanged properties of the passivating layer, very high breakdown voltages. Particular attention is invited to the fact that the dielectric produced for the capacitors with the aid of the inventive method is a preferably thermally grown oxide layer which is coated on both sides with metallic electrodes, and that this oxide layer is not produced by vapor deposition. This fact is of considerable importance because, as is well known, capacitors using vapor deposited dielectrics have certain drawbacks, particularly due to the presence of the so-called "pin-holes" which are not present when the inventive method is used.

Figure 6:
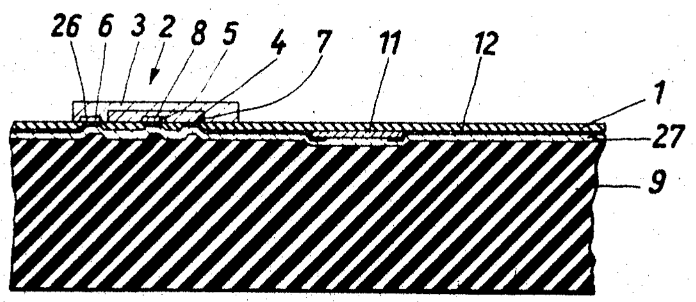

In accordance with the principles of the present invention, it is also possible to produce passive components and conductive paths on the insulating layer 1 of the semiconductor body even before the insulating body 9 is provided on the solid-state circuit. Such an embodiment is illustrated in FIGURE 6. Again, a semiconductor body is covered with an insulating layer 1, and subsequently, active semiconductor components are produced in the semiconductor body, for example the transistor 2, having collector zone 3, base zone 4, emitter zone 5, terminals 6, 7 and 8, and a low resistance collector region 26. Then, conductive paths and passive components are provided on the insulating layer 1, for example, the resistor 11 and the conductive path 12. Thereafter, the insulating support body 9 is placed on the side of the arrangement containing the active and passive elements and the conductive paths, the placing of body 9 being performed, if desired, after the surface of the unit is first covered with a passivating layer 27. Subsequently, the semiconductor body is removed down to the monocrystalline regions containing the active components, for example the transistor 2, this removal being effectuated, for example, by mechanically abrading the semiconductor body and by subsequently etching away the unnecessary semiconductor material around the desired monocrystalline regions. In this manner, the inventive arrangement illustrated in FIGURE 6 is produced.

Figure 7:
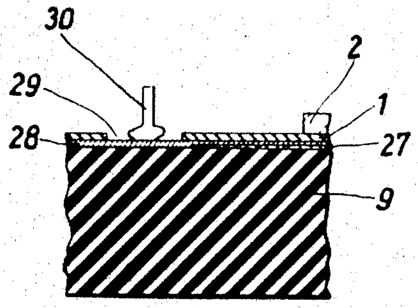
FIGURES 7 to 10 are views similar to that of FIGURE 1 showing various arrangements for making external electrical connections for units produced according to the present invention.

Examples of techniques for making connections to such a circuit arrangement are shown in FIGURES 7 to 10. FIGURE 7 shows a portion of the border region of a unit fabricated according to the present invention. Reference numeral 28 designates a conductive path formed to have a thickened portion in the border region. The passivation layer 1 is perforated at a point 29 in order to provide a location for the connection of an external contact 30, for example by means of thermocompression.

Figure 8:
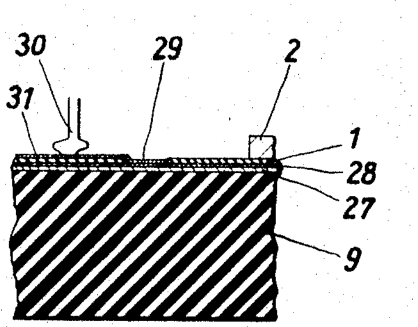

In FIGURE 8, an arrangement is shown wherein a conductive path 31 is vapor deposited onto the passivation layer 1, this path being connected to the conductive path 28 by way of the perforation 29. The external contact 30 is then joined to the conductive path 31 in a conventional manner.

Figure 9:
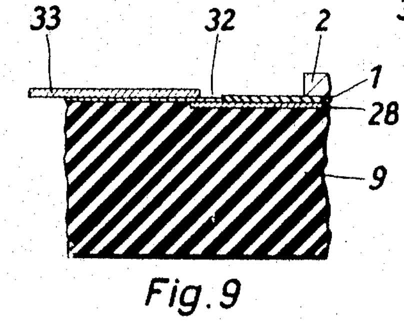

Another arrangement for the making of external contacts is shown in FIGURE 9. Between the insulating body 9 and the passivation layer 1, there is provided the conductive path 28 which, in this case, does not extend all the way up to the edge of the circuit arrangement. Then, the passivation layer 1 is removed in such a manner that an end portion of the conductive path 28 and part of the surface of the insulating body 9 are uncovered. A metallic layer 32 is vapor deposited onto these uncovered portions, and a connection 33 is joined to this layer 32, for example by means of soldering, welding or thermocompression.

Figure 10:
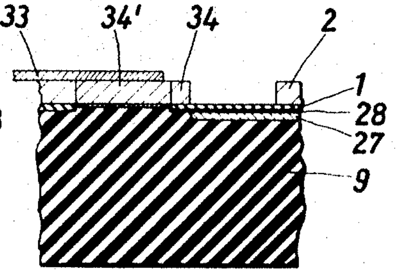

It is not indispensable that the external connections be made to the thin conductive layers; these connections can also be made through a semiconductor material placed between the leads and the thin layers for the purpose of increasing the stability of the contacts. FIGURE 10 shows such an example. In this example, a monocrystalline semiconductor region 34 has been left during fabrication in the border zone of the circuit arrangement, in the vicinity of the monocrystalline semiconductor region 2. This semiconductor region 34 has a zone 34' which is sufficiently highly doped to place it in the degenerate range. The zone 34' is in ohmic contact with the conductive path 28 through a perforation in the insulating layer 1. Finally, the leads 33 are provided on the semiconductor layer 34 in a conventional manner.

Lastly, it should be mentioned that the entire suggested microminiaturized circuit arrangement can be housed in either metal-glass or metal-ceramic casings, or it can also be directly encapsulated, for example with an artificial resin.

It will be understood that the above description of the present invention is susceptible to various modifications, changes and adaptations, and the same are intended to be comprehended within the meaning and range of equivalents of the appended claims.

What is claimed is:

1. Method for the production of a microminiaturized circuit, comprising the steps of:

(a) providing a semiconductor body containing a plurality of solid-state circuit elements;

(b) placing a self-supporting insulating body of a magnetic material on at least that surface portion of said semiconductor body containing said circuit elements; and (c) removing material from said semiconductor body in such a way as to electrically isolate said circuit elements from each other.

2. A process as recited in claim 6 wherein said removal of material acts to capacitatively decouple said circuit elements.

3. A method as recited in claim 6 wherein said step of removing portions of said semiconductor body comprises removing material down to the zones containing said semiconductor elements in order to resistively and capacitatively isolate said circuit elements from each other.

4. A method as recited in claim 6 wherein said step of attaching an insulating support body comprises the vapor-deposition of a glass material onto said semiconductor body.

5. A method as recited in claim 6 comprising the further step of selecting a material for said insulating support body having a coefficient of thermal expansion which is similar to that of said semiconductor body.

6. A method for producing a microminaturized circuit arrangement, comprising the steps of:

(a) forming active semiconductor elements in one surface of a semiconductor body;

(b) covering that portion of said surface which contains said elements with an insulating layer to form a base unit;

(c) providing conductive terminals on said insulating layer so that one end of each of said terminals contacts a selected region of one of said semiconductor elements and the other end of each of said terminals extends beyond the lateral dimensions of its respective semiconductor element;

(d) attaching an insulating support body to that side of said unit which carries said semiconductor elements and said terminals;
(e) removing the portions of said semiconductor body surrounding said active semiconductor elements;
(f) perforating said insulating layer at points directly above those ends of said terminals which extend beyond the lateral dimensions of the semiconductor elements; and
(g) depositing passive elements and conductive paths on that side of said insulating layer which faces said active semiconductor elements and establishing connections, through said perforations, between said terminals and said elements and conductive paths.

7. A method as recited in claim 6 comprising the further step of coating said passive elements and conductive paths with a further insulating layer.

8. A method according to claim 6 wherein said step of attaching an insulating carrier body comprises the operations of applying a layer of glazing material to one surface of a ceramic body and attaching the resulting composite body to said insulating layer so that said layer of glazing material is interposed between said ceramic body and said insulating layer.

9. A method as recited in claim 8 comprising the step of providing a thin solder layer on said layer of glazing material before attaching said carrier body to said insulating layer.

10. A method as recited in claim 6 comprising the further step of providing multi-layer conductive paths on said insulating body.

11. A method as recited in claim 1, comprising the further steps of: coating a portion of said insulating body with a glazing material; providing at least one coil on an unglazed portion of said surface of said insulating body; and placing a ferrite body on each of the coils provided.

12. A method as recited in claim 11 wherein said ferrite body has a cup-shaped form.

13. A method as recited in claim 6 wherein conductive path bridges are created by means of the following steps:
(a) vapor-depositing conductive paths onto said insulating layer simultaneously with the vapor-deposition of said terminals;
(b) perforating said insulating layer at points above the ends of said conductive paths after the attachment of said insulating carrier body; and
(c) extending said conductive paths through said perforations and upon the other side of said insulating layer.

14. A method for producing capacitors as part of a solid-state body hybrid cricuit, comprising the steps of:
(a) providing a semiconductor body;
(b) coating at least one surface of said body with an insulating layer by means of thermal oxidation;
(c) vapor-depositing metallic electrodes upon the exposed surface of said insulating layer;
(d) attaching an insulating support body to said exposed surface of said insulating layer;
(e) removing portions of said semiconductor body so as to expose those surface portions of said insulating layer which are opposite said metallic electrodes;
(f) perforating said insulating layer at points opposite said metallic electrodes;
(g) vapor-depositing second metallic electrodes on said insulating layer in regions facing said first-recited electrodes; and
(h) vapor-depositing conductive paths on that surface of said insulating layer which is furthest away form said insulating support body so that said conductive paths are connected, by way of the perforations formed in said insulating layer, with said first-recited metallic electrodes.

15. A method as recited in claim 14 comprising the additional step of forming rescesses in that surface of said insulating layer which is furthest away from said insulating body, in regions across from said metallic electrodes, prior to the vapor-deposition of said second metallic electrodes.

16. In a method for producing a microminiaturized circuit, the improvement comprising the steps of:
(a) providing a semiconductor body having semiconductor components formed along at least one of its surfaces;
(b) covering said one surface of said semiconductor body with an insulating layer;
(c) depositing conductive paths and passive circuit elements on said insulating layer;
(d) applying an insulating support body to that surface of said insulating layer which carries said conductive paths and said passive circuit elements;
(e) removing the portions of said semiconductor material which surround said active circuit components; and
(f) removing said insulating layer at desired points so as to uncover a portion of at least one of said conductive paths and passive circuit elements, the deposition of said conductive paths being carried out in such a way that they are wider in the regions where they are uncovered.

17. A method as recited in claim 16 cmoprising the further steps of: depositing connection paths on the insulating layer surface furthest away from said support body in such a way that each of said connection paths forms an electrical contact with the uncovered portion of a respective one of said conductive paths and passive circuit elements; and providing a permanent external contact to each of said connection paths.

18. In a method for producing a microminaturized circuit, the improvement comprising the steps of:
(a) providing a semiconductor body having semiconductor components formed along at least one of its surfaces;
(b) covering said one surface of said semiconductor body with an insulating layer;
(c) depositing conductive paths and passive circuit elements on said insulating layer;
(d) applying an insulating support body to that surface of said insulating layer which carries said conductive paths and said passive circuit elements;
(e) removing the portions of said semiconductor material which surround said active circuit components; and
(f) removing said insulating layer at desired points so as to uncover a portion of at least one of said conductive paths and passive circuit elements, said step of removing being carried out by removing a portion of the insulating layer so as to uncover a portion of the surface of said insulating body, and depositing a connection path on the surfaces exposed by the removal of said insulating layer so that said connection path extends from one of said conductive paths and passive elements and across the uncovered portion of said insulating body.

19. A method as recited in claim 18 comprising the further step of providing an external lead in permanent contact with said connection path.

20. A method recited in claim 6 comprising the further steps of: prior to said step of attaching an insulating support body, forming a strongly degenerately doped semiconductor island in that surface of said semiconductor body facing said insulating layer and providing a conductive path so that it contacts one side of said island; and subsequent to said step of applying an insulating support body, connecting an external lead to the opposite side of said island from said conductive path connected thereto.

(References on following page)

References Cited

UNITED STATES PATENTS

| | | | |
|---|---|---|---|
| 2,981,877 | 4/1961 | Noyce. | |
| 3,158,788 | 11/1964 | Last | 317—101 |
| 3,199,002 | 8/1965 | Martin | 29—577 X |
| 3,247,428 | 4/1966 | Perri et al. | |
| 3,290,753 | 12/1966 | Chang | 29—577 |
| 3,300,832 | 1/1967 | Cave | 29—580 |
| 3,320,485 | 5/1967 | Buie | 317—101 |

OTHER REFERENCES

IBM Tech. Disc. Bull., vol. 3, No. 12, May 1961, pp. 26 and 27.

JOHN F. CAMPBELL, Primary Examiner

U.S. Cl. X.R.

29—578, 583, 590, 591, 625